(12) United States Patent
Wang

(10) Patent No.: US 11,952,279 B2
(45) Date of Patent: Apr. 9, 2024

(54) MODIFIED CARBON NANOMATERIALS AS TRACERS FOR RESERVOIR MONITORING

(71) Applicant: ARAMCO SERVICES COMPANY, Houston, TX (US)

(72) Inventor: Wei Wang, Quincy, MA (US)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 63 days.

(21) Appl. No.: 17/409,271

(22) Filed: Aug. 23, 2021

(65) Prior Publication Data
US 2023/0059347 A1  Feb. 23, 2023

(51) Int. Cl.
| | |
|---|---|
| C01B 32/15 | (2017.01) |
| B82Y 30/00 | (2011.01) |
| B82Y 40/00 | (2011.01) |
| E21B 47/11 | (2012.01) |

(52) U.S. Cl.
CPC .............. *C01B 32/15* (2017.08); *E21B 47/11* (2020.05); *B82Y 30/00* (2013.01); *B82Y 40/00* (2013.01); *C01P 2004/64* (2013.01)

(58) Field of Classification Search
CPC ......... C01B 32/15; E21B 47/11; B82Y 30/00; B82Y 40/00; C01P 2004/64
See application file for complete search history.

(56) References Cited

U.S. PATENT DOCUMENTS

| | | |
|---|---|---|
| 9,260,957 B2 | 2/2016 | Commarieu et al. |
| 9,528,045 B2 | 12/2016 | Kanj et al. |
| 10,119,072 B2 | 11/2018 | Kanj et al. |

(Continued)

FOREIGN PATENT DOCUMENTS

| | | | | |
|---|---|---|---|---|
| CN | 108456518 | * | 1/2013 | ......... C09K 11/7783 |
| CN | 108456518 A | | 8/2018 | |

(Continued)

OTHER PUBLICATIONS

Kumar, et al., Lanthanum Ortho-Ferrite (LaFeO3) Nano-Particles based Electrochemical Sensor for the Detection of Dopamine, Biointerface Research in Applied Chemistry 2020; 10(5): 6182-6188 (Year: 2020).*

(Continued)

*Primary Examiner* — Daniel C. McCracken
(74) *Attorney, Agent, or Firm* — Osha Bergman Watanabe & Burton LLP (57) ABSTRACT

A carbon nanoparticle and methods of making and using a carbon nanoparticle are provided. The carbon nanoparticle includes a reaction product of an organic reactant, an alkoxy amine, and an organometallic compound. The organometallic compound includes an element selected from the group consisting of a rare earth element, a transition metal element, and combinations thereof, and the carbon nanoparticle includes from 0.5 to 50 wt. % of the element. A method of making the carbon nanoparticle is also provided. The method includes combining the organic reactant, the alkoxy amine, and the organometallic compound into a mixture and heating the mixture such that the carbon nanoparticle forms. A method of determining a flow characteristic of a formation or an attribute of a fluid in a formation using the carbon nanoparticle is also provided.

4 Claims, 4 Drawing Sheets

(56) References Cited

U.S. PATENT DOCUMENTS

| | | | |
|---|---|---|---|
| 2012/0318503 A1* | 12/2012 | Kanj | C07C 235/74 977/773 |
| 2013/0109597 A1 | 5/2013 | Sarkar et al. | |
| 2015/0001385 A1 | 1/2015 | Perriat et al. | |
| 2015/0361334 A1 | 12/2015 | Kwon et al. | |
| 2015/0376493 A1 | 12/2015 | Huh et al. | |
| 2016/0002523 A1 | 1/2016 | Huh et al. | |
| 2017/0022804 A1* | 1/2017 | Gupta | E21B 47/11 |
| 2017/0361376 A1 | 12/2017 | Murugesan et al. | |
| 2021/0246365 A1 | 8/2021 | Borrell et al. | |
| 2021/0396130 A1 | 12/2021 | Trinder | |
| 2023/0059347 A1 | 2/2023 | Wang | |

FOREIGN PATENT DOCUMENTS

| | | |
|---|---|---|
| CN | 108690609 A | 10/2018 |
| CN | 110734051 A | 1/2020 |
| CN | 111718713 A | 9/2020 |
| CN | 112457718 A | 3/2021 |
| CN | 112457842 A | 3/2021 |
| CN | 113528132 A | 10/2021 |
| WO | 2020008174 A1 | 1/2020 |
| WO | 2020044013 A1 | 3/2020 |

OTHER PUBLICATIONS

Sucrose, accessed online at https://pubchem.ncbi.nlm.nih.gov/compound/Sucrose on Apr. 8, 2023. (Year: 2023).*

Ferric nitrate, accessed online at https://pubchem.ncbi.nlm.nih.gov/compound/Ferric-nitrate on Apr. 8, 2023 (Year: 2023).*

Lanthanum oxide, accessed online at: https://pubchem.ncbi.nlm.nih.gov/compound/Lanthanum-oxide on Apr. 8, 2023 (Year: 2023).*

Ethanolamine, accessed online at https://pubchem.ncbi.nlm.nih.gov/compound/Ethanolamine on Apr. 8, 2023 (Year: 2023).*

Pakkath, et al., Transition Metal Ion (Mn2+, Fe2+, Co2+, and Ni2+) Doped Carbon Dots Synthesized via Microwave-Assisted Pyrolysis: A Potential Nanoprobe for Magneto-fluorescent Dual-Modality Bioimaging, ACS Biomater. Sci. Eng. 2018; 4: 2582-2596 (Year: 2018).*

Shi, et al., Facile synthesis of gadolinium (III) chelates functionalized carbon quantum dots for fluorescence and magnetic resonance dual-modal bioimaging, Carbon 2015; 93: 742-750 (Year: 2015).*

Zhang, et al., When rare earth meets carbon nanodots: mechanisms, applications and outlook, Chem. Soc. Rev. 2020; 49: 9220-9248 (Year: 2020).*

Kanj, et al., Oil industry first field trial of inter-well reservoir nanoagent tracers, Micro- and Nanotechnology Sensors, Systems, and Applications VII, Proc. of SPIE 2015; 9467: 94671D-1 to 94671D-5 (Year: 2015).*

Bhartiya, et al., Carbon dots: Chemistry, properties and applications, Journal of the Indian Chemical Society 2016; 93: 1-8 (Year: 2016).*

Lim et al.; "Carbon quantum dots and their applications"; Chemical Society Reviews; vol. 44; Issue 1; Oct. 2014; pp. 362-381 (20 pages).

Hola et al.; "Carbon dots—Emerging light emitters for bioimaging, cancer therapy and optoelectronics"; Nano Today; vol. 9; Sep. 26, 2014; pp. 590-603 (14 pages).

Murugesan et al.; "Carbon Quantum Dots Fluorescent Tracers for Production and Well Monitoring"; SPE-181503-MS; Society of Petroleum Engineers; Sep. 2016 (8 pages).

Hu et al.; "Carbon quantum dots with tracer-like breakthrough ability for reservoir characterization"; Science of the Total Enviroment; vol. 669; Jun. 15, 2019; pp. 579-589 (11 pages).

Ma et al.; "Carbon Dots as Fluorescent Sensitive Tracers in Reservoir Engineering"; ARMA-CUPB-19-7663; ARMA-CUPB Geothermal International Conference; Aug. 2019 (7 pages).

Warsi et al.; "Emergence of robust carbon quantum dots as nanotracer for groundwater studies"; Diamonds & Related Materials; vol. 103; Jan. 11, 2020 (12 pages).

Kanj et al., "Oil Industry First Field Trial of Inter-Well Reservoir Nanoagent Tracers". Micro- and Nanotechnology Sensors, Systems, and Applications VII, Proc. of SPIE, 2015, vol. 9467, p. 94671D-1-94671D-5, 6 pages.

Ismael et al., "Facile synthesis method for fabrication of LaFeO3/g-C3N4 nanocomposite as efficient visible-light-driven photocatalyst for photodegradation of RhB and 4-CP", New J. Chem., 2019, vol. 43, pp. 13783-13793, 12 pages.

Wang et al., "Lanthanide-Doped Nanocrystals: Synthesis, Optical-Magnetic Properties, and Applications," Accounts of Chemical Research, 2011, 44, 322-332, 11 pages.

Yang et al., "Hydrophobic carbon dots with blue dispersed emission and red aggregation-induced emission," Nature Communications, 2019, 10, 1789, 11 pages.

Vallan et al., "Interfacing transition metal dichalcogenides with carbon nanodots for managing photoinduced energy and chargetransfer processes," Journal of the American Chemical Society, Sep. 17, 2018, 12 pages.

Zhao et al., "One-step solvothermal synthesis of high-emissive amphiphilic carbon dots via rigidity derivation," Chemical Science, Dec. 12, 2017, 7 pages.

Zhi et al., "Multicolor polymeric carbon dots: synthesis, separation and polyamide-supported molecular fluorescence," Chemical Science, Dec. 22, 2020, 15 pages.

Zhao et al., "Yellow-Emitting Hydrophobic Carbon Dots via Solid-Phase Synthesis and Their Applications," ACS Omega, Sep. 1, 2020, 9 pages.

Bhartiya et al., "Carbon dots : Chemistry, properties and applications," Journal of the Indian Chemical Society, Jul. 2016, 9 pages.

Ethanolamine accessed online at https://pubchem.ncbi.nlm.nih.gov/compound/Ethanolamine on Apr. 8, 2023, 72 pages (Year: 2023).

Office Action issued in related U.S. Appl. No. 17/929,587, dated Nov. 30, 2023 (12 pages).

* cited by examiner

MODIFIED CARBON NANOMATERIALS AS TRACERS FOR RESERVOIR MONITORING

BACKGROUND

Tracers are commonly used in the oil industry for tracking oil and water flow patterns through reservoirs. Tracers can be injected into a reservoir, and afterwards producing lines are sampled to determine concentrations of the tracers that are present at the time of their arrival. The concentrations data can be used to understand fluid flow patterns and to infer other properties of the reservoir, for example, pore volumes and flow characteristics.

Carbon dots (C-dots), also referred as carbon nanoparticles (C-NPs) or carbon quantum dots (CQDs), are a class of carbon nanomaterials that have attracted interest because of their water solubility, chemical inertness, low toxicity, ease of functionalization and resistance to photobleaching. When used as tracers in reservoirs, C-dots can adapt to different temperature, salinity, and pH, environments in the process of revealing components of the reservoir. C-dots may exhibit strong fluorescence in visible spectral range and are readily detectable by fluorescence imaging and spectroscopy methods. However, the fluorescence emission of C-dots may have broad bands. The emission maximums vary depending on the excitation wavelength.

SUMMARY

The Summary is provided to introduce a selection of concepts that are further described in the Detailed Description. The Summary is not intended to identify key or essential features of the claimed subject matter, nor is it intended to be used as an aid in limiting the scope of the claimed subject matter.

In one aspect, embodiments disclosed herein relate to a carbon nanoparticle comprising a reaction product of an organic reactant, an alkoxy amine, and an organometallic compound. The organometallic compound includes an element selected from the group consisting of a rare earth element, a transition metal element, and combinations thereof, and the carbon nanoparticle comprises from 0.5 to 50 wt. % of the element.

In another aspect, embodiments disclosed herein related to a method of making a carbon nanoparticle. The method includes combining an organic reactant, an alkoxy amine, and an organometallic compound into a mixture and heating the mixture such that the carbon nanoparticle forms. The organometallic compound includes an element selected from the group consisting of a rare earth element, a transition metal element, and combinations thereof.

In yet another aspect, embodiments disclosed herein relate to a method of determining a flow characteristic of a formation or an attribute of a fluid in a formation. The method includes introducing an aqueous dispersion comprising carbon nanoparticles of one or more types into an injection well associated with a formation at a first location, recovering produced fluid from a production well associated with the formation at a second location, detecting the presence of one or more of the one or more types of carbon nanoparticles in the produced fluids, and determining at least one flow characteristic of the formation or an attribute of the fluid in the formation between the first and the second location based upon the detected one or more of the one or more types of carbon nanoparticles.

Other aspects and advantages of the claimed subject matter will be apparent from the following description and the appended claims.

DETAILED DESCRIPTION

Tracer studies can be used to collect data for the subsurface fluid flow analysis. In a tracer study, one or more tracers may be injected at an injection site of the reservoir. The tracer may mix with the fluid in the subsurface under the injection site. For example, the tracer may diffuse into the fluid or may mix with the fluid due to advection. After some time, samples of the fluid may be collected at a producing site for analysis. The propagation patterns of the one or more tracers between the injecting site and the producing site may be used to determine the presence and location of flow barriers and fractures between the two sites in the reservoir as well as management of fluids flowing the formation. In some cases, multiple injection sites and multiple producing sites may be selected in a reservoir. Tracers may be injected in each of the multiple injection sites and fluid samples may be collected at each of the multiple producing sites to analyze the fluid movement pattern of at least a portion of the reservoir. Tracers may also be introduced into a circulating stream of drilling fluid at different interval times and then samples of the drilling fluid may be collected based upon the rate of circulation at different times to analyze the fluid traveling time correlating to deeps in drilling operation.

Embodiments of the present disclosure generally relate to a composition used as a tracer in hydrocarbon-bearing formations. The composition comprises a carbon nanoparticle, also referred to as a carbon dot, that also includes at least one transition metal or rare earth element. Due to their fluorescent properties, the disclosed compositions may be used in reservoir flooding applications and in drilling fluids as tracers.

Carbon Dot Tracer Composition

In one aspect, embodiments disclosed relate to a tracer composition having a modified carbon dot. As used here, "carbon dot" means a carbon nanoparticle. As used here, "carbon nanoparticle" means a carbon particle having nanoscale dimensions, meaning a diameter of less than one hundred nanometers. Carbon dots in accordance with the present disclosure are comprised of the reaction product of an organic reactant, an alkoxy amine, and an organometallic compound. The organometallic compound includes an element selected from the group consisting of a rare earth element, a transition metal element, and combinations thereof.

Carbon dots of the disclosed composition may have an appropriate average particle size for use as a tracer in a reservoir. In some embodiments, the average carbon dot particle diameter may have a range of from about 5 nm (nanometers) to about 100 nm as measured via transmission electron microscopy. Unless indicated otherwise, average particle size refers to the particle size as measured via transmission electron microscopy. The average carbon dot particle diameter may have a lower limit of one of 5, 10, 15, 20, 30, and 40 nm, and an upper limit of one of 50, 60, 70, 80, 90, and 100 nm, where any lower limit may be paired with any upper limit.

Carbon dot particles may have any shape suitable for use as a tracer. In one or more embodiments, the carbon dots are spherical. In one or more embodiments the carbon dots may have a geometric shape that is not spherical, such as, but not limited to, cubic, rhomboidal, elliptical, or pyramidal. In one or more embodiments, the carbon dots may have an irregular shape.

Carbon dots of the present disclosure may have a suitable surface chemistry for dispersion in particular solvents. In one or more embodiments, the carbon dots may be hydrophilic. In such embodiments, the surface of the carbon dots may be functionalized with carboxyl and hydroxyl groups.

Carbon dots of the present disclosure may be modified to include at least one rare earth element or at least one transition metal element. As used here, "modified carbon dot" means a carbon dot that includes at least one rare earth or transition metal element. In one or more embodiments, carbon dots may include at least one of a rare earth element or a transition metal element.

In one or more embodiments, the rare earth element may comprise at least one member of the Lanthanide periodic series of elements. In one or more embodiments, the rare earth element may comprise at least one member of the Actinide periodic series of elements. A rare earth element may be selected from the group consisting of $La^{3+}$, $Ce^{3+/4+}$, $Pr^{3+}$, $Nd^{3+}$, $Pm^{3+}$, $Sm^{3+}Eu^{3+}$, $Gd^{3+}$, $Tb^{3+}$, $Dy^{3+}$, $Ho^{3+}$, $Er^{3+}$, $Tm^{3+}$, $Yb^{3+}$, $Lu^{3+}$, $Th^{3+}$, and $U^{4+}$. Ionic species of rare earth elements are listed to indicate their charge when present as ions in a solution, however, as will be understood by those skilled in the art, the rare earth elements may be present in a neutral state in one or more embodiments. In particular, in embodiments in which the rare earth element is included in a modified carbon dot, the rare earth element may be in a neutral state.

In one or more embodiments, the transition metal element may comprise at least one member of the transition metal periodic groups of elements. In one or more embodiments, the transition metal element may comprise at least one member of the post-transition metal periodic groups of elements. A transition metal element may be selected from the group consisting of $Sc^{3+}$, $Ti^{3+}$, $Bi^{3+}$, $Ga^{3+}$, $Hf^{4+}$, $Zr^{4+}$, $Co^{3+}$, $Mn^{3+}$, $Pd^{2+}$, and $Y^{2+}$. Ionic species of transition metal elements are listed to indicate their charge when present as ions in a solution, however, as will be understood by those skilled in the art, the transition metal elements may be present in a neutral state in one or more embodiments. In particular, in embodiments in which the transition metal element is included in a modified carbon dot, the transition metal element may be in a neutral state.

Carbon dots may include a suitable amount of rare earth or transition metal elements for use as a tracer. In one or more embodiments, the carbon dot composition may include a range of from about 0.5 wt. % (weight percent) to about 50 wt. % of rare earth or transition metal elements. The amount of rare earth or transition metal element may have a lower limit of one of 0.5, 1.0, 2.0, 5.0, 10.0 and 15.0 wt. %, and an upper limit of one of 20.0, 25.0, 30.0, 40.0, 45.0 and 50.0 wt. %, where any lower limit may be paired with any upper limit.

Carbon nanoparticles, such as the carbon dots, may fluoresce when exposed to UV (ultraviolet) or visible radiation. When carbon dots are modified to include a rare earth element, a transition metal element, or both, the modified carbon dots maintain the fluorescence properties of the carbon dot and may possess new or improved fluorescent properties when exposed to UV or visible radiation versus without such rare earth or transition metal modification. The inclusion of rare earth elements, transition metal elements, or both may not measurably change the fluorescence properties of the carbon nanoparticles. In some cases, the wavelength of fluorescence may be tuned by selecting a particular rare earth or transition metal element in combination with a particular chelating agent. The fluorescent properties allow the disclosed modified carbon dots to be used as tracers because they may be readily detected via spectroscopic techniques in collected samples from a producing well. Additionally, different types of tracers, meaning tracers that contain different rare earth or transition metal elements, may be readily detected via inductively coupled plasma optical emission spectroscopy (ICP-OES) or inductively coupled plasma-mass spectrometry (ICP-MS) techniques to obtain more complex information about reservoir properties. As each rare earth or transition metal element has a particular signature when detected via ICP-OES or ICP-MS, the rare earth or transition metal elements may act as "barcodes" for identification purposes. Thus, the disclosed modified carbon dots may be detected via fluorescence spectroscopy due to the presence of carbon nanoparticles, and may further be quantified due to the presence of rare earth and/or transition metal elements.

Method of Making a Carbon Dot Tracer

Figure 1:
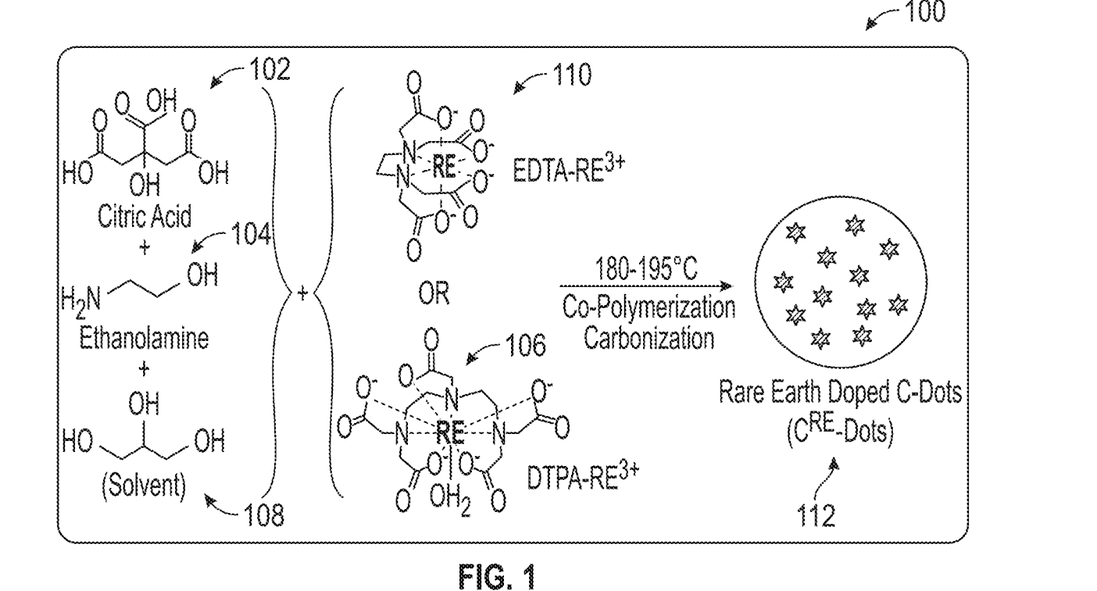
FIG. 1 is a reaction scheme in accordance with one or more embodiments.

One or more embodiments relate to a method of making the previously disclosed modified carbon dots. In one or more embodiments, the modified carbon dots are synthesized using a one pot chemical synthesis method. A reaction scheme of an embodiment method is shown in FIG. 1. In the disclosed one pot chemical synthesis method 100, an organic reactant 102, an alkoxy amine 104, an organometallic compound 106, and a solvent 108, are combined to form a mixture. The mixture is then heated 110 to a sufficient temperature for a sufficient amount of time such that the reaction proceeds to form the modified carbon dot 112.

As previously described, an organic reactant may be a reactant in the one pot synthesis method. In one or more embodiments, the organic reactant includes at least one hydroxyl group. Types of organic reactants may include organic acids and saccharides. In one or more embodiments, the organic reactant is selected from the group consisting of citric acid, glucose, and combinations thereof. The organic reactant may be included in the reaction mixture in an amount of from 50 to 95 wt. % (weight percent) as compared to the weight of the organometallic compound.

As previously described, an alkoxy amine may be a reactant in the one pot synthesis method. In one or more embodiments, the alkoxy amine is selected from the group consisting of ethanolamine, diethanolamine, ethylenediamine, and combinations thereof.

The organic reactant and the alkoxy amine may be present in an appropriate ratio for achieving suitable nanoparticle fluorescence. In one or more embodiments, the molar ratio of the organic reactant to the alkoxy amine may be about 1:1 or about 1:2 or about 1:3.

As previously described, an organometallic compound may also be a reactant in the one pot synthesis method. The organometallic compound may include a rare earth or transition metal element bonded to an organic ligand. Organic ligands suitable for the disclosed organometallic compounds are referred to as chelating agents. Chelating agents bind strongly with metal ions to form an organometallic compound. Suitable chelating agents may include, but are not limited to, ethylenediaminetetraacetic acid (EDTA), pentetic acid (DTPA), tetraxetan (DOTA), ethylenediamine-N,N'-bis (2-hydroxyphenylacetic acid) (EDDHA), 2,2'-bipyridine-4, 4'-dicarboxylic acid (BPDA), 2,6-pyridinedicarboxylic acid (PDA), and 1,10-phenanthroline-2,9-dicarboxylic acid (PDCA). In one or more embodiments, the molar ratio of chelating agent to organometallic compound is about 1:1.

Any suitable solvent may be used in the disclosed synthesis method. In one or more embodiments, polar solvents with a suitable boiling point for facilitating the carbon dot synthesis method. Solvents, such as water, ethylene glycol, diethylene glycol, tritheylene glycol, and glycerol, may be used.

As previously described, once the reaction components are mixed, the mixture is heated to an appropriate temperature such that a reaction to form modified carbon dots takes place. In one or more embodiments, the reaction temperature may be in a range of from about 180 to about 210° C. In this temperature range, carbonization of the organic material in the reaction takes place. The reaction time may be in a range of from about 1 to 12 hours. The reaction may be considered complete once the desired fluorescent of the carbon nanoparticles is achieved.

As the components of the reaction mixture are heated, components of the mixture first undergo copolymerization and then carbonization. Copolymerization is a step in which at least two reaction components, such as the organic reactant, the alkoxy amine, and the organometallic compound, may polymerize to form a polymer structure. In one or more embodiments, the amine groups on the alkoxy amine, the carboxylic acid groups on the organic reactant, and the hydroxyl groups on the organic reactant may react to form a polymer structure.

As the reaction progresses at the previously described elevated temperature, the polymer structure may be carbonized to form the modified carbon dot structure. In the carbonization process, functionality such as amine and hydroxyl groups are partially removed, leaving a structure that is largely composed of amorphous carbon and the previously described rare earth or transition metal elements.

An Aqueous Dispersion Composition Comprising a Carbon Dot Tracer

In another aspect, embodiments disclosed relate to a dispersion of modified carbon dots for use as tracers in hydrocarbon-bearing formations. Disclosed dispersions may include an aqueous medium and the previously described modified carbon dots. The modified carbon dots are readily dispersible in an aqueous medium. In one or more embodiments, the aqueous medium includes water. The water may comprise one or more known compositions of water, including distilled; condensed; filtered or unfiltered fresh surface or subterranean waters, such as water sourced from lakes, rivers or aquifers; mineral waters; gray water; run-off, storm or wastewater; potable or non-potable waters; brackish waters; synthetic or natural sea waters; synthetic or natural brines; formation waters; production water; and combinations thereof.

The carbon nanoparticles may be present in the aqueous medium in an appropriately high concentration such that when injected as a tracer composition in a formation, the tracer chemicals are produced from the well at a part per billion (ppb) concentration. In one or more embodiments, the concentration of carbon nanoparticles in the aqueous medium may be from about 10,000 ppm (parts per million) to about 100,000 ppm. The concentration of carbon nanoparticles in the aqueous medium may have a lower limit of one of 10,000, 20,000, 30,000, 40,000 and 50,000 ppm and an upper limit of one of 60,000, 70,000, 80,000, 90,000 and 100,000 where any lower limit may be paired with any mathematically compatible upper limit.

Method of Using a Dispersion of Carbon Dot Tracers in Reservoir Flooding

Figure 2:
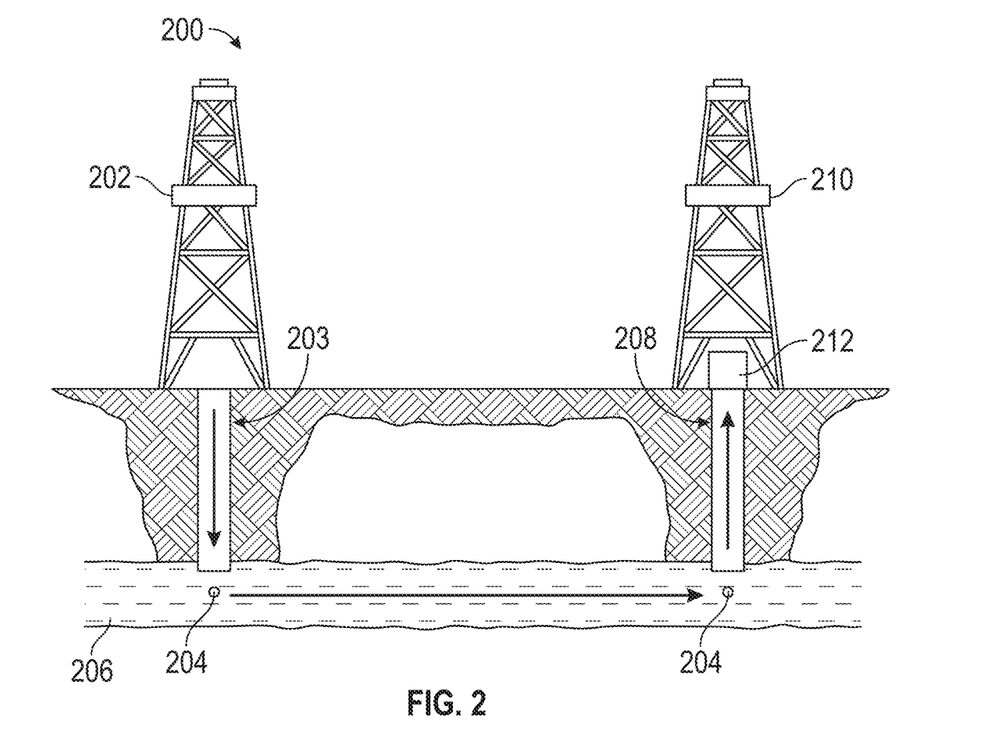
FIG. 2 is a schematic of a reservoir in accordance with one or more embodiments.

In another aspect, embodiments disclosed relate to a method of determining a flow characteristic of a formation. FIG. 2 is a schematic diagram that illustrates a formation 200 in which the disclosed tracers may be utilized. The formation 200 includes a first wellbore drilling system 202 located at an injection site. A dispersion of one or more tracers 204 may be injected into the first wellbore 203 such that they mix with subsurface fluid 206. The formation 200 also includes a second wellbore drilling system 210 located at a producing site. Subsurface fluid 206 may be extracted at the second wellbore 208 at the producing site. The producing site may also include a tracer detection unit 212 on the surface to detecting the recovered tracers 204.

Figure 3:
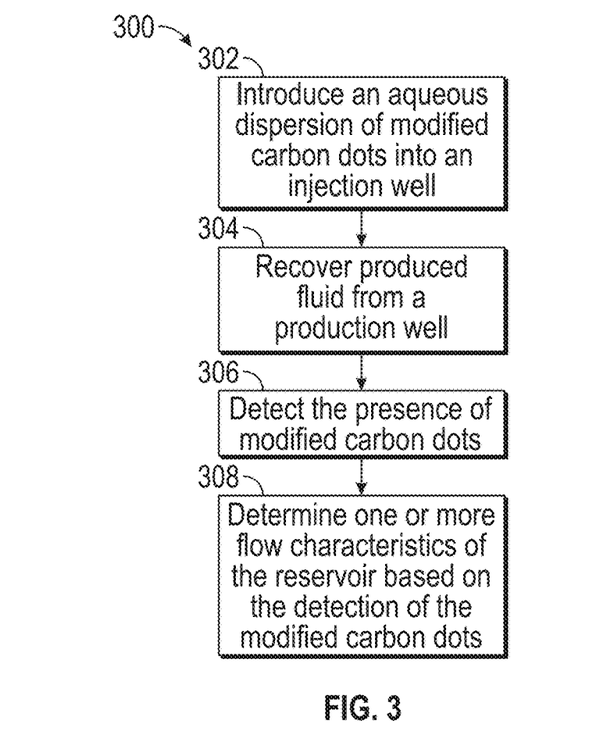
FIG. 3 is a block flow diagram of a method in accordance with one or more embodiments.

A method in accordance with one or more embodiments of the present disclosure is shown in FIG. 3. The method 300 includes introducing the previously described aqueous dispersion having one or more types of modified carbon dots into a wellbore using an injection well 302. Produced fluid is then recovered from a production well 304. After the produced fluid is recovered 304, the presence of the modified carbon dots is detected via a spectroscopic technique 306. Based on the detection of the modified carbon dots, one or more flow characteristics of the formation may be determined 308.

As previously described, the modified carbon dots may be introduced into a wellbore using an injection well. As may be appreciated by those skilled in the art, depending upon the formation property that is being determined, the type(s) of tracer(s), the number of injection wells and production wells, and the time of tracer introduction may be appropriately varied in order to determine a certain property. In one or more embodiments, a single type of tracer is introduced into the injection well. In one or more embodiments, multiple types of tracers may be introduced into the same injection well at different times. In one or more embodiments, different types of tracers may be introduced into different injection wells.

After the modified carbon dots have been introduced into the wellbore, fluid is produced at a production well. The produced fluid may be collected at certain intervals in order to determine the presence of, and the concentration of, the modified carbon dots in the produced fluid. Fluid may be collected monthly or biweekly before the expected time of the carbon dots reaching a production well. Thereafter, once the presence of carbon dots has been confirmed in the produced fluid, produced fluid may be collected one or two times per week for analysis to determine the presence of, and concentration of, the disclosed modified carbon dots.

As described previously, the presence of modified carbon dots in the produced fluid may be detected in the recovered fluid. Carbon dots in recovered samples may be detected via analytical techniques, such as fluorescence spectroscopy, inductively coupled plasma atomic emission spectroscopy (ICP-AES), and inductively coupled plasma mass spectrometry (ICP-MS). The presence of modified carbon dots may be detected using fluorescence spectroscopy while other techniques, such as ICP-AES and ICP-MS, may be used to quantify the amount of carbon dots even at reduced concentrations, such as in the parts per million and parts per billion range, which may be the result of fluid dilution and scattering. Techniques such as ICP-AES and ICP-MS may be used to determine the concentration of modified carbon dots in produced fluid by measuring the concentration of rare earth or transition metal elements in the sample.

The detected types and quantities of modified carbon dots along with the characteristics of the produced fluid in which the modified carbon dots are present may be used to determine fluid flow aspects within a formation. In one or more embodiments, fluid flow dynamics across wells may be determined. The determination may also reveal connectively aspects of portions of a formation.

Method of Using a Dispersion of Carbon Dot Tracers in Drilling Fluid

Figure 4:
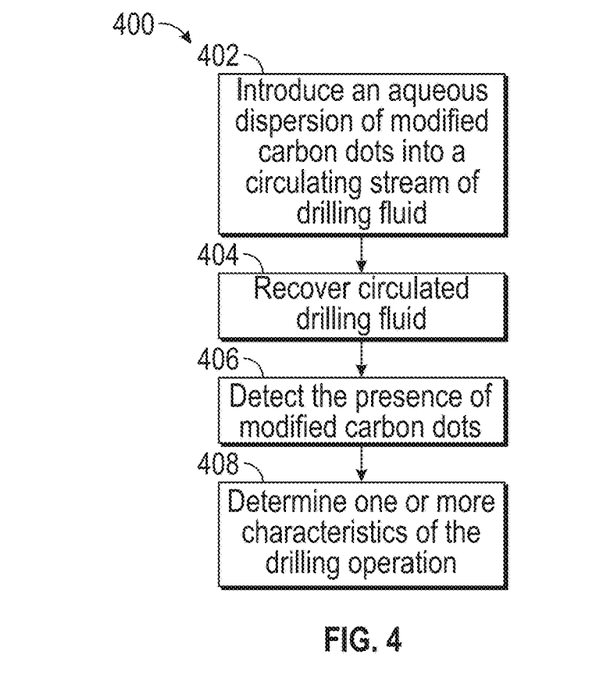
FIG. 4 is a block flow diagram of a method in accordance with one or more embodiments.

In one or more embodiments, methods using the previously described modified carbon dots may include using the tracers in drilling fluid. An embodiment method is shown in FIG. 4. The method 400 includes introducing an aqueous dispersion of modified carbon dots into a circulating stream of drilling fluid 402. After an amount of time, circulated drilling fluid is recovered 404 and the presence of the modified carbon dots is detected 406. Based on the presence of the modified carbon dots, one or more characteristics of a drilling operation may be determined.

Due to their dispersibility in aqueous media, modified carbon dots disclosed herein may be utilized in aqueous base drilling fluids without any additional modification. Modified carbon dots may be used in oil-based muds, however, suitable formulations, such as an emulsion of a surfactant in oil, are necessary to ensure proper dispersion.

In drilling operations, a dispersion of modified carbon dots may be introduced into the circulating drilling stream, and then samples of the drilling fluid may be collected based upon the rate of circulation, such as on the order of minutes or hours.

Carbon dots in the drilling fluid may be detected via analytical techniques such as fluorescence spectroscopy, inductively coupled plasma atomic emission spectroscopy (ICP-AES), and inductively coupled plasma mass spectrometry (ICP-MS). Such analytical techniques are useful for detecting the presence of different tracers and their concentrations as previously described.

EXAMPLES

Materials

Citric acid monohydrate (Certified ACS, granular) and ethanolamine (laboratory grade) were obtained from Fisher. Other materials are commercially available and may be obtained and used as known by those skilled in the art.

Methods

A JEOL 2100 transmission electron microscope (JEOL; Dearborn, MI, USA) was used for particle size analysis. An iCAP 7000 spectrometer (ThermoFisher Scientific; Waltham, MA, USA) was used for ICP-OES analysis. Any commercially available fluorescence spectrometer known by those skilled in the art may be used for fluorescence spectroscopy experiments.

Example 1

0.005 moles of ethylenediaminetetraacetic disodium (EDTA-$Na_2$) and 0.002 moles of europium nitrate (Eu($NO_3$)$_3$) were dissolved in 10 mL (milliliters) deionized (DI) water. 0.02 moles of citric acid and 0.06 moles ethanolamine were added and dissolved to form a clear solution. The solution was heated at 75° C. to evaporate the water. The solution remained at this temperature until a syrup-like viscous liquid formed (about 12 hours). The mixture was then heated to 180° C. and held for 2 hours. After the reaction was completed, the mixture was cooled to room temperature. The viscous dark brown product was then dispersed in water and a stable, brown suspension was obtained.

Example 2

0.005 moles of EDTA-$Na_2$ and 0.002 moles of Eu($NO_3$)$_3$ were dissolved in 10 mL D.I. water. Then 0.02 moles citric acid and 0.06 moles ethanolamine were added and dissolved to form a solution. The solution was mixed with 25 mL of glycerol and then heated at a constant ramp rate of 5° C./min (degrees Celsius change per minute) until the mixture reached 180° C. The temperature was held at 180° C. for 2 hours. After the reaction was completed, the mixture was cooled to room temperature. The resultant was diluted in water. A stable brown suspension was obtained.

Example 3

0.005 moles of EDTA-$Na_2$ and 0.002 moles of Eu($NO_3$)$_3$ were dissolved in 50 mL D.I. water. Then 0.02 moles citric acid and 0.06 moles ethanolamine were added and dissolved to form a solution. The solution was transferred to a Teflon®-lined autoclave and heated to 185° C. The temperature was held at 185° C. for 6 hours. After the reaction was completed, the mixture was cooled to room temperature. The resultant was diluted in water. A stable brown suspension was obtained.

Transmission Electron Microscopy (TEM) Analysis

Figure 5A:
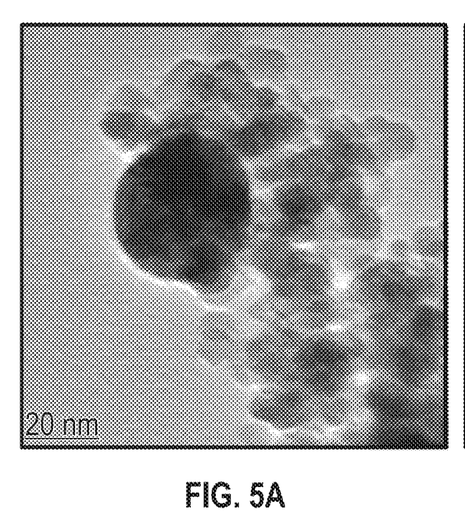
FIG. 5A is a transmission electron micrograph of particles in accordance with one or more embodiments.
Figure 5B:
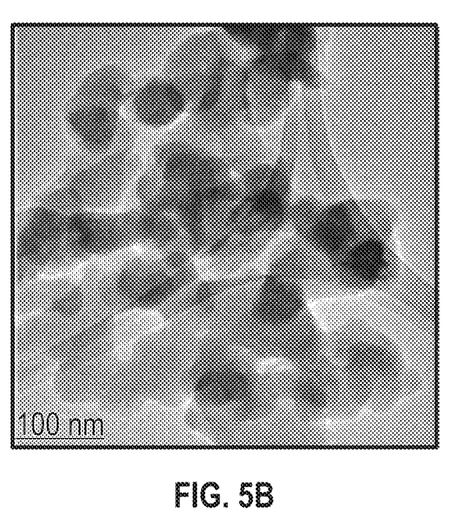
FIG. 5B is a transmission electron micrograph of particles in accordance with one or more embodiments.

Samples from Example 3 were analyzed via TEM. As shown in FIGS. 5A and 5B, the particle diameters of the synthesizes carbon dots are in a range of about 5 to 100 nm and the shape is spherical and somewhat irregular. EDS analysis confirmed the homogeneous distribution of Eu on the carbon nanoparticles.

Fluorescence Spectroscopy

Figure 6:
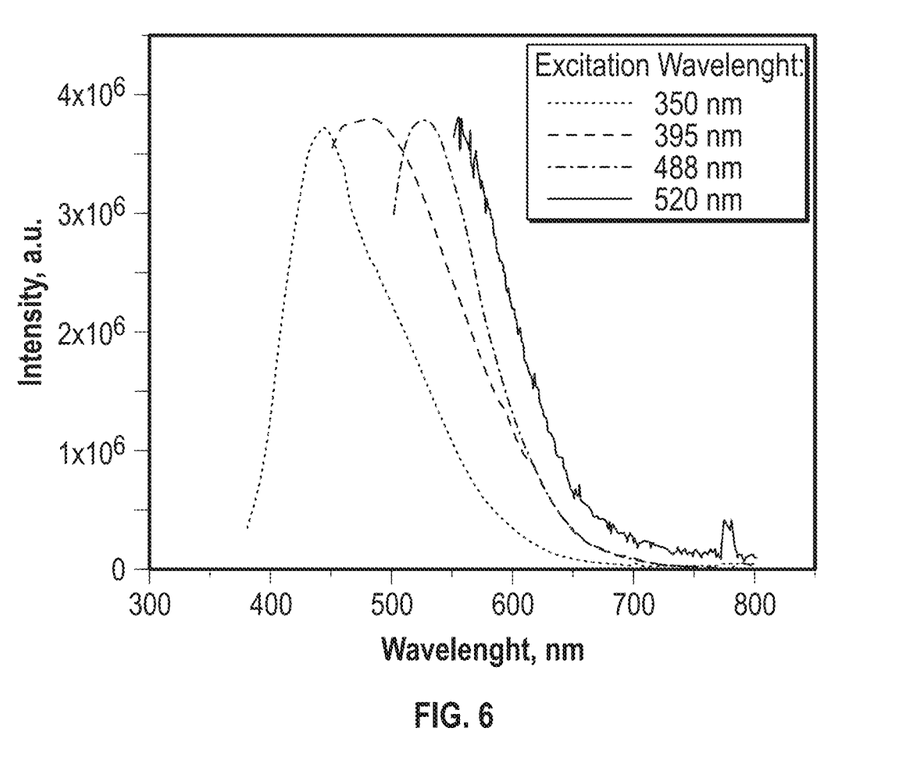
FIG. 6 is a plot of fluorescence spectroscopy data in accordance with one or more embodiments.

FIG. 6 shows fluorescence spectra of samples from Example 2 at different excitation wavelengths. As shown, the emission wavelength varies based upon the excitation wavelength. The limit of detection (LOD) may reach sub-ppm (parts per million volume) level for the modified carbon dots for this fluorescence measurement technique. As used here, parts per million means 1 milligram (mg) per liter of water.

Inductively Coupled Plasma Optical Emission Spectroscopy (ICP-OES)

Figure 7:
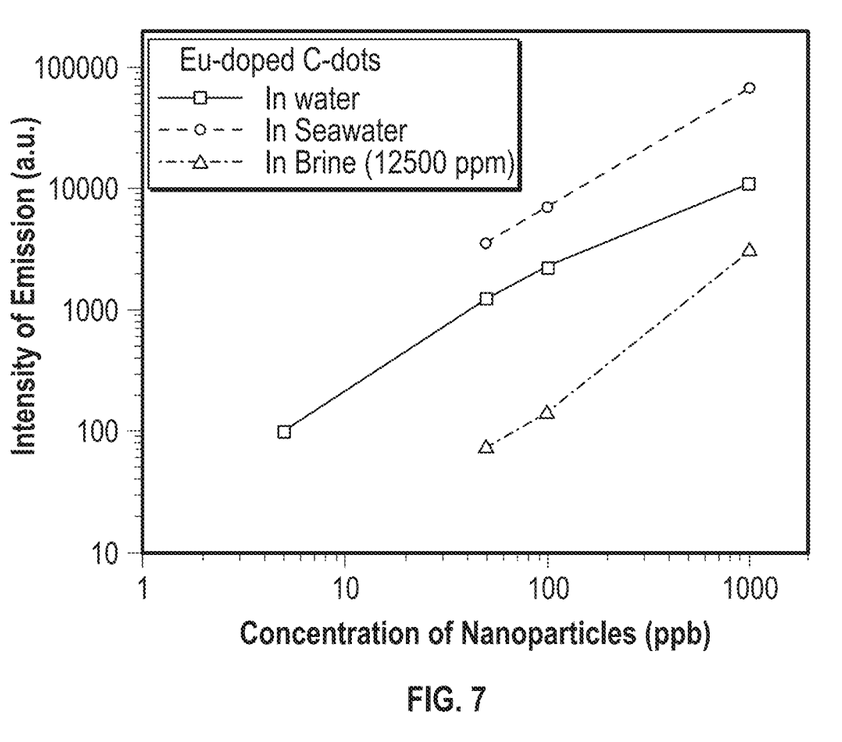
FIG. 7 is a plot of inductively coupled plasma atomic emission spectroscopy data in accordance with one or more embodiments.

Example 1 was prepared for analysis via ICP-OES by adding the sample to a 6 molar nitric acid solution to dissolve the rare earth and/or transition metal elements. FIG. 7 shows the results of performing ICP-OES on samples from Example 1 at different concentrations in different media. The limit of detection (LOD) may be lower than 50 ppb (parts per billion) by the ICP analysis. As used here, parts per billion means 1 microgram (μg) per liter of water.

Stability Studies

Stability studies demonstrated that the modified carbon dots may be readily dispersed in water, seawater, and brines. Retention of the modified carbon dots in reservoir rocks was evaluated by mixing the modified carbon dots with crushed powder of limestone in brine and maintaining the solution for at least 7 days at 95° C. Their fluorescence spectra were compared before and after the time at 95° C., and the results suggest super low (negligible) adsorption of carbon dots on rocks.

The singular forms "a," "an," and "the" include plural referents, unless the context clearly dictates otherwise.

As used here and in the appended claims, the words "comprise," "has," and "include" and all grammatical variations thereof are each intended to have an open, non-limiting meaning that does not exclude additional elements or steps.

When the word "approximately" or "about" are used, this term may mean that there can be a variance in value of up to ±10%, of up to 5%, of up to 2%, of up to 1%, of up to 0.5%, of up to 0.1%, or up to 0.01%.

Ranges may be expressed as from about one particular value to about another particular value, inclusive. When such a range is expressed, it is to be understood that another embodiment is from the one particular value to the other particular value, along with all particular values and combinations thereof within the range.

While the disclosure includes a limited number of embodiments, those skilled in the art, having benefit of this disclosure, will appreciate that other embodiments may be devised which do not depart from the scope of the present disclosure. Accordingly, the scope should be limited only by the attached claims.

Thus, particular implementations of the subject matter have been described. Other implementations are within the scope of the following claims Although only a few example embodiments have been described in detail, those skilled in the art will readily appreciate that many modifications are possible in the example embodiments without materially departing from the scope of the disclosure. Accordingly, all such modifications are intended to be included within the scope of this disclosure as defined in the following claims. In the claims, means-plus-function clauses are intended to cover the structures described as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims, except for those in which the claim expressly uses the words 'means for' together with an associated function.

What is claimed:

1. A carbon nanoparticle comprising:
   a reaction product of an organic reactant, an alkoxy amine, and an organometallic compound, where the organometallic compound is a rare earth element; wherein
   the carbon nanoparticle comprises from 15.0 to 40 wt. % of the rare earth element, and
   the carbon nanoparticle is fluorescent.

2. The carbon nanoparticle of claim 1, comprising an average particle size of from 5 nm (nanometers) to about 100 nm.

3. The carbon nanoparticle of claim 1, wherein the carbon nanoparticle is hydrophilic.

4. The carbon nanoparticle of claim 1, wherein the element is a rare earth element selected from the group consisting of $La^{3+}$, $Ce^{3+/4+}$, $Pr^{3+}$, $Nd^{3+}$, $Pm^{3+}$, $Sm^{3+}$$Eu^{3+}$, $Gd^{3+}$, $Tb^{3+}$, $Dy^{3+}$, $Ho^{3+}$, $Er^{3+}$, $Tm^{3+}$, $Yb^{3+}$, $Lu^{3+}$, $Th^{3+}$, and $U^{4+}$.

* * * * *